US006262372B1

(12) United States Patent

Naegelin et al.

(10) Patent No.: US 6,262,372 B1
(45) **Date of Patent: *Jul. 17, 2001**

(54) ELECTRICAL TERMINAL WITH INTEGRAL PTC ELEMENT

(75) Inventors: Conrad Luther Naegelin, Canton; Akiyoshi Sato, West Bloomfield, both of MI (US)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/648,904

(22) Filed: Aug. 25, 2000

Related U.S. Application Data

(63) Continuation of application No. 09/076,427, filed on May 12, 1998, now Pat. No. 6,172,303.

(51) Int. Cl.[7] .............................................. H02G 3/06

(52) U.S. Cl. .................... 174/68.1; 174/70 R; 174/94 S; 338/221

(58) Field of Search ................................ 174/68.1, 70 R, 174/84 R, 94 R, 94 S, 135; 338/22 R, 220, 221

(56) References Cited

U.S. PATENT DOCUMENTS 5,909,168 * 1/1999 Miyasaka et al. ................. 338/22 R
5,945,903 * 8/1999 Reddy et al. ........................ 337/197
5,982,253 * 11/1999 Perrin et al. ......................... 333/182
6,172,303 * 1/2001 Naegelin et al. .................. 174/68.1

* cited by examiner

*Primary Examiner*—Dean A. Reichard
*Assistant Examiner*—W. David Walkenhorst
(74) *Attorney, Agent, or Firm*—Young & Basile, P.C.

(57) ABSTRACT

An electrical terminal such as that used in a multi-pin connector has a layer of positive temperature coefficient (PTC) material incorporated therein such that the terminal also serves as a circuit over-current protection device. In a first embodiment, a surface of the terminal is covered by a layer of PTC material such that when the terminal is engaged with a mating terminal, the PTC material is interposed between the surfaces of the mated terminals to create a PTC device. In an alternative embodiment of the invention, a terminal includes a contact portion for making electrical connection with a mating terminal, a wire connection portion for connection to a wire, and a layer of PTC material interposed between adjacent surfaces of the contact portion and wire connection portion. The invention terminals provide over-current protection to a circuit without the need for soldering or otherwise connecting a separate PTC device into the circuit.

2 Claims, 2 Drawing Sheets

ELECTRICAL TERMINAL WITH INTEGRAL PTC ELEMENT

RELATED APPLICATIONS

This application is a continuation application of application Ser. No. 09/076,427 filed on May 12, 1998 which is now U.S. Pat. No. 6,172,303 issued Jan. 9, 2001 to Naegelin, et al.

FIELD OF THE INVENTION

BACKGROUND OF THE INVENTION

Positive temperature coefficient (PTC) materials exhibit an electrical resistivity (resistance per unit thickness) which is relatively low at a design operating temperature and increases abruptly as the temperature of the material rises above a critical temperature. This property can be used to create devices which protect electrical circuits against over-current conditions.

A PTC circuit over-current protection device generally comprises a layer of PTC material sandwiched between two plates of electrically conductive metal. Electrical leads are attached to each of the plates and are connected to the electrical circuit. At a given operating temperature, there is a maximum steady level of electrical current which can pass from one plate to the other through the PTC material without causing significant resistance heating of the device. This level of current is known as the "pass" or "hold" current. If the current level rises above the hold current, resistance heating causes the temperature of the PTC element to rise above the critical temperature and the resistance of the device increases sharply so that only a very low level of current can pass through the device, effectively opening the circuit.

PTC devices are typically used in place of conventional fuses and/or circuit breakers in various electrical and electronic devices, and are usually mounted on a printed circuit board or otherwise hard-wired into the circuit to be protected. PTC materials include compositions such as conductive polymers and ceramics.

SUMMARY OF THE INVENTION

It is an object of this invention to eliminate the additional wiring and interconnections typically required when connecting an over-current protection device to a circuit.

A further object of the invention is to incorporate a positive temperature coefficient (PTC) material into terminals providing electrical connection within the circuit to be protected.

In a first illustrative embodiment of the invention, a surface of a male electrical terminal is covered by a layer of PTC material. When the male terminal is inserted into mating engagement with a female terminal, the PTC material is interposed between the surfaces of the mated terminals to create a PTC device through which electrical current must pass in order to flow through the circuit in which the terminals are connected. As a result, over-current protection is provided to the associated circuitry without the need for soldering or otherwise connecting a separate PTC device into the circuit. In an alternative construction of such a terminal, an inner surface of a female terminal is covered by the PTC material. When placed in mating engagement with a conventional male terminal, the PTC material is interposed between the surfaces of the two terminals to create a PTC device.

In a second illustrative embodiment of the invention, a terminal comprises a contact portion for making electrical connection with a mating terminal, a wire connection portion for connection to a wire, and a layer of PTC material interposed between adjacent surfaces of the contact portion and wire connection portion. The layer of PTC material is the only electrically conductive connection between the two portions of the terminal so that current must flow through the layer in order to pass through the circuit.

DESCRIPTION OF THE PREFERRED EMBODIMENT

Figure 1:
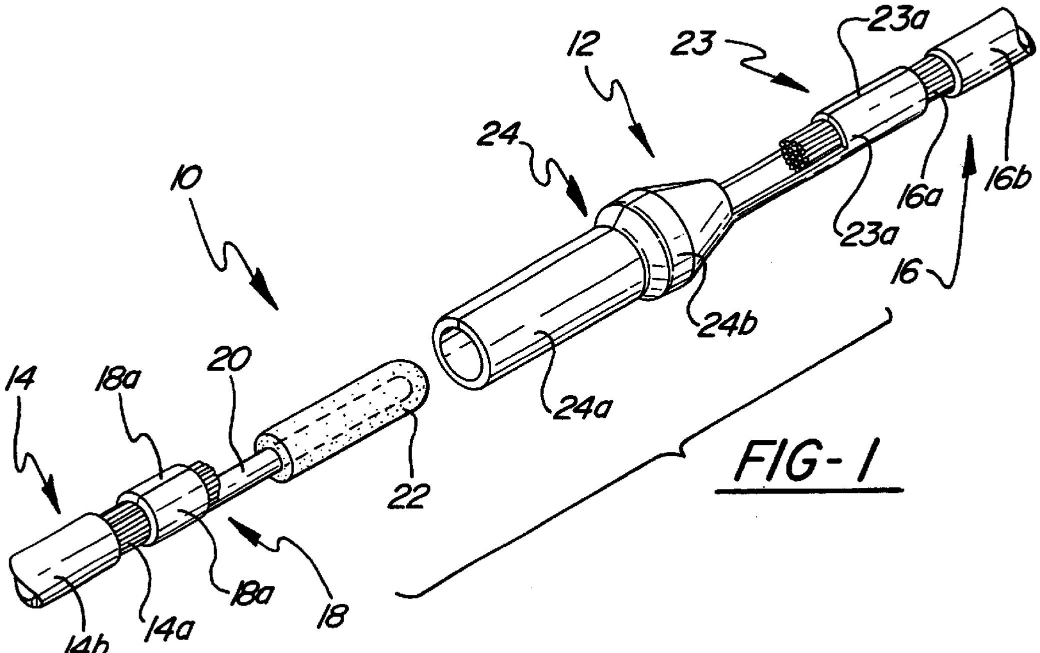
FIG. 1 is a perspective view of a male terminal and a mating female terminal, the male terminal having a surface covered by a PTC material according to the present invention.
Figure 2:
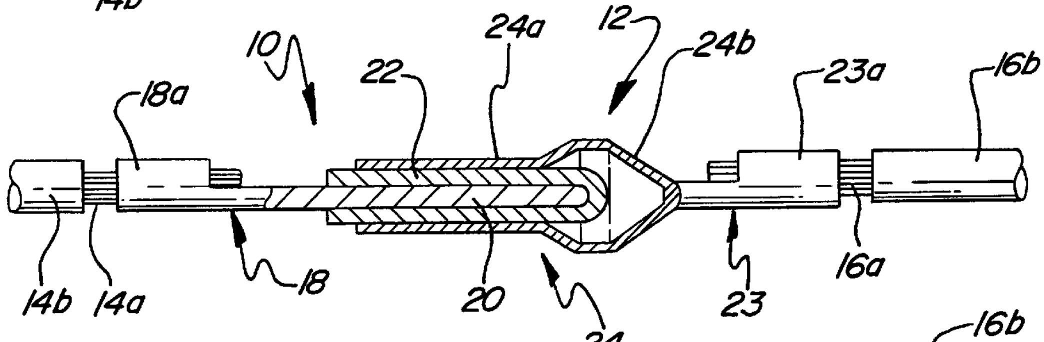
FIG. 2 is a partially sectioned side view showing the terminals of FIG. 1 mated with one another.

Referring now to FIGS. 1 and 2, a pair of mating electrical terminals 10,12 according to the present invention are illustrated. Each terminal is attached to a wire 14,16 comprising a core 14*a*,16*a* made up of electrically conductive strands and an insulating sheath 14*b*,16*b* surrounding the core. The sheath 14*b*,16*b* is stripped from the end of the wire to expose the core 14*a*,16*b* for attachment to the respective terminal 10,12.

The male electrical terminal 10 has a wire attachment portion 18 which includes bendable tabs 18*a* for crimping into connection with the wire core 14*a*, as is well known in the art. A pin 20 is formed integrally with and extends from the wire attachment portion 18. The pin 20 is surrounded by a layer of a positive temperature coefficient (PTC) material 22.

The female electrical terminal 12 comprises a wire attachment portion 23 having tabs 23*a* which are crimped around the wire core 16*a* and a contact portion 24 extending therefrom and configured for mating connection with the male terminal 10. The contact portion 24 comprises a cylindrical barrel 24*a* and a hollow bulb 24*b* having a greater inside diameter than the barrel.

Connection between the male and female electrical terminals 10,12 is achieved by inserting the pin 20 of the male terminal into the barrel 24*a* of the female terminal as seen in FIG. 2. When the terminals 10,12 are mated, the PTC layer 22 is interposed between the outer surface of the pin 20 and the inner surface of the female terminal contact portion 24 such that any electric current flowing between the two terminals must pass through the PTC layer 22. The dimensional relationship between the inside diameter of the barrel 24*a* and the outside diameter of the PTC layer 22 on the pin 20 should be such that the two terminals 10,12 fit snugly into engagement with one another, but not so tight as to require excessive force to join the terminals.

The hold current of the PTC device resulting from joining of the terminals is a function of the type of PTC material used, the surface area of the PTC layer 22 in contact with the outer surface of the male terminal pin 20, and the surface area of the PTC layer in contact with the inner surface of the barrel. Consequently, the hold current can be manipulated by adjusting the lengths and diameters of the pin 20 and the barrel 24*a*. The cross-sectional shapes of the terminal contact portions need not be circular, but may be of any shape required to yield the amount of surface area necessary for the desired hold current.

The PTC material may be applied to the pin 20 by, for example, a molding or dipping process. If necessitated by the type of PTC material used, a binding agent may be used to improve the adhesion between the PTC material and the pin 20.

Figure 3:
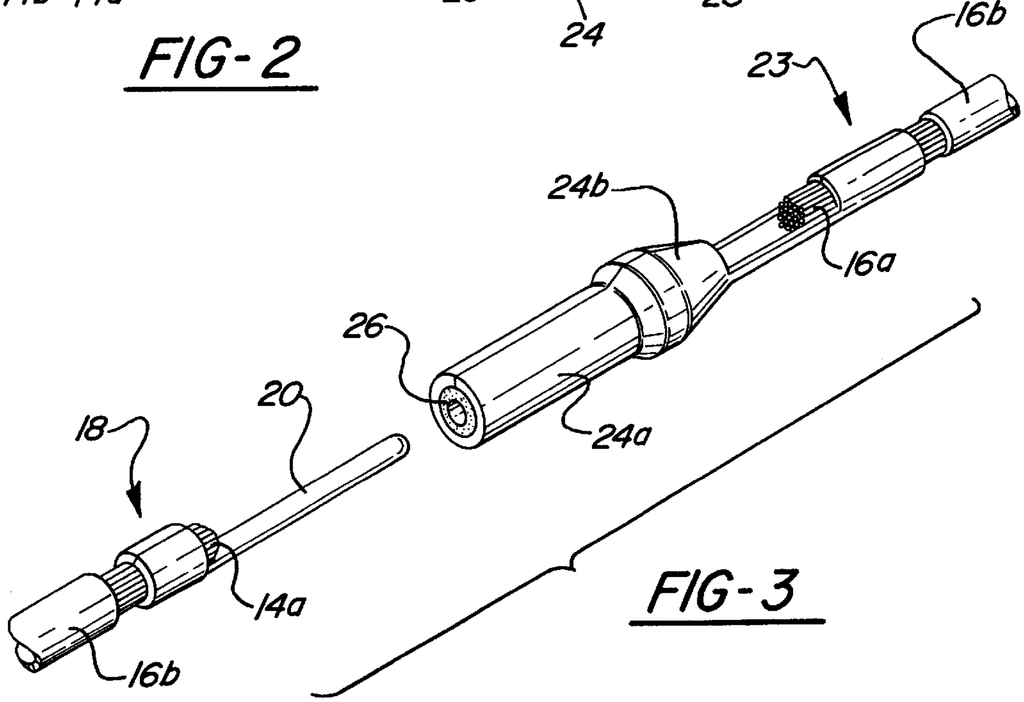
FIG. 3 is a perspective view of a male terminal and a female terminal, the female terminal having an inner surface covered by a layer of a PTC material.

As illustrated in FIG. 3, an alternative version of the invention PTC terminal may be created by forming a layer of PTC material 26 on the inner surface of the female terminal barrel 24*a*. The female terminal 12 is typically stamped from a thin sheet of conductive metal, and the barrel 24*a* formed by rolling a flat portion of the stamping into a cylinder. This flat portion may be coated with the PTC material before the rolling process.

Figure 4:
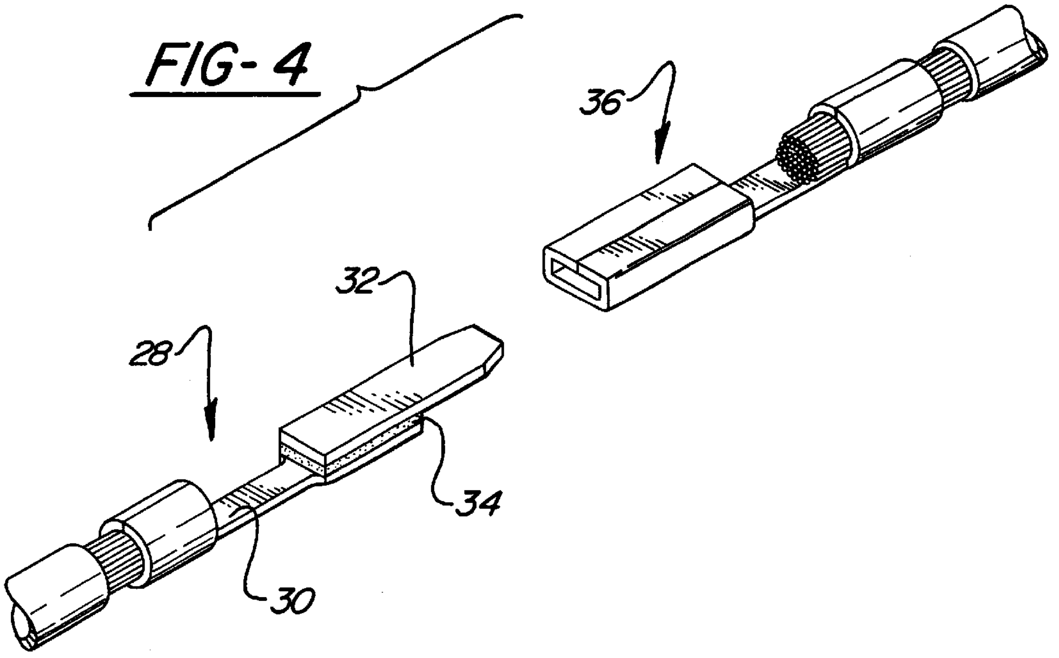
FIG. 4 is a perspective view of male and female terminals according to a second embodiment of the invention, the male terminal having a layer of PTC material sandwiched between first and second portions thereof.

In a second embodiment of the invention illustrated in FIG. 4, a male terminal 28 comprises a wire attachment portion 30 made of electrically conductive metal and crimped onto the core 14*a* of wire, and a contact portion 32 in the form of a flat blade terminal and formed from a separate piece of metal. A layer of PTC 34 material is interposed between overlapping flat sections of the contact portion 32 and the wire attachment portion 30 so that any electric current conducted through the terminal 28 must pass through the PTC layer 34. The male terminal 28 mates with a female terminal 36 of essentially conventional construction.

Figure 5:
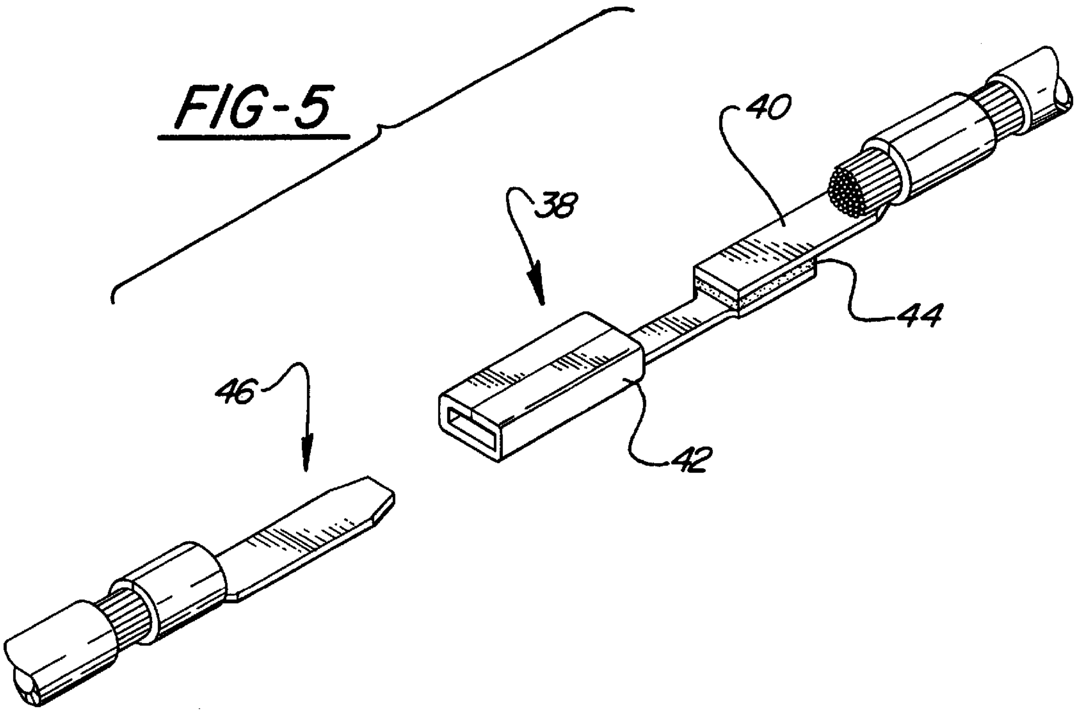
FIG. 5 is a perspective view of another form of the second embodiment of the invention wherein the female terminal has a PTC layer sandwiched between first and second portions thereof.

In an alternative construction of the second embodiment of the invention, shown in FIG. 5, a female terminal 38 comprises a wire attachment portion 40 and a contact portion 42, with a layer of PTC material 44 interposed between overlapping flat portions thereof to create a PTC device. The female terminal 38 mates with an essentially conventional male terminal 46.

In the embodiments of FIGS. 4 and 5, the central section of the terminal having the PTC layer 34,44 may be surrounded by an electrically insulating coating (not shown) to protect against contact with contaminants or other conductive objects that may result in an electrical short circuit between the contact portion and the wire attachment portion, by-passing the PTC layer. When such a terminal is used in a multi-pin connector (not shown), however, such an insulating coating may not be necessary since the body of the connector in which the terminal is housed would most likely provide adequate protection against shorting.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A male electrical terminal for making electrical connection by insertion into a mating female electrical terminal, the male terminal comprising a metal insertion portion and a layer of positive temperature coefficient material surrounding an outer surface of the metal insertion portion, the layer having a surface for making contact with the female terminal, whereby the layer is interposed between the metal insertion portion and the female terminal when the male terminal is inserted into the female terminal.

2. A female electrical terminal for making electrical connection with a mating male electrical terminal adapted to be inserted therein, the female terminal comprising a metal contact portion adapted to receive an insertion portion of the male terminal and having an inner surface with a layer of positive temperature coefficient material covering the inner surface of the metal contact portion, the PTC layer having a surface for making contact with the insertion portion of the male terminal, whereby the PTC layer is interposed between the metal contact portion of the female terminal and the insertion portion of the male terminal when the female terminal receives the male terminal.

* * * * *

UNITED STATES PATENT AND TRADEMARK OFFICE
CERTIFICATE OF CORRECTION

PATENT NO. : 6,262,372 B1
DATED : July 17, 2001
INVENTOR(S) : Naegelin

It is certified that error appears in the above-identified patent and that said Letters Patent is hereby corrected as shown below:

Column 1,
Line 10, after "FIELD OF THE INVENTION" insert

-- This invention relates in general to electrical terminals such as those used in multi-pin electrical connectors, and more specifically to such a terminal having an integral positive temperature coefficient device to protect associated circuitry against over-current conditions. --

Signed and Sealed this

Twenty-seventh Day of November, 2001

*Attest:*

Nicholas P. Godici

NICHOLAS P. GODICI

*Attesting Officer* *Acting Director of the United States Patent and Trademark Office*